No. 745,305. PATENTED NOV. 24, 1903.
A. L. WILLARD.
WOVEN COLLAR OR CUFF.
APPLICATION FILED SEPT. 20, 1901.
NO MODEL.
3 SHEETS—SHEET 1.

WITNESSES:
F. W. Wright
S. C. Connor

INVENTOR
ALFRED LEOPOLD WILLARD
BY
Howson and Howson
HIS ATTORNEYS.

No. 745,305. PATENTED NOV. 24, 1903.
A. L. WILLARD.
WOVEN COLLAR OR CUFF.
APPLICATION FILED SEPT. 20, 1901.
NO MODEL. 3 SHEETS—SHEET 2.
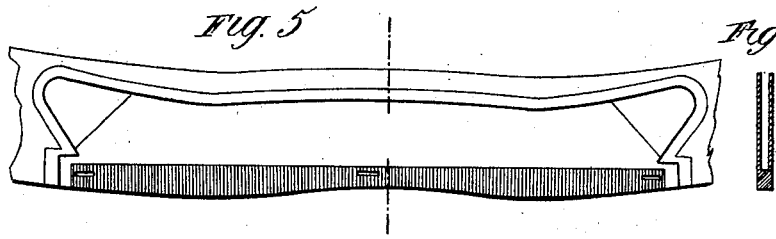
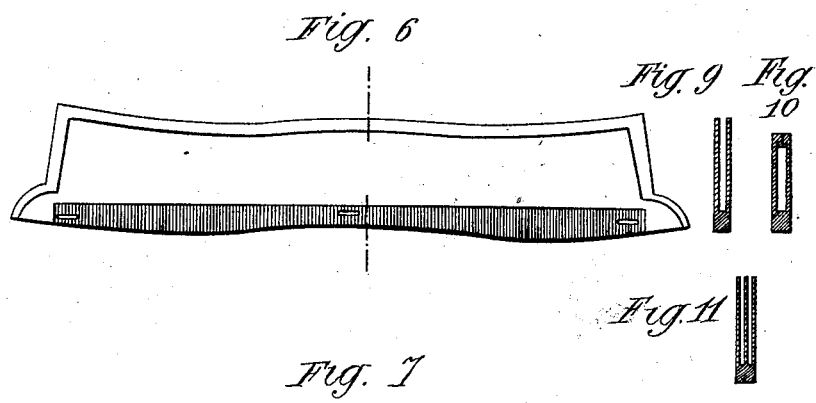
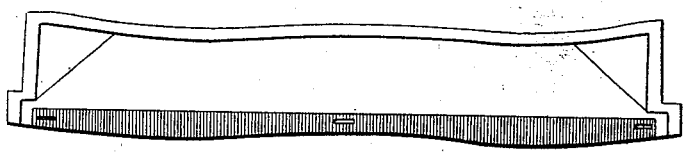
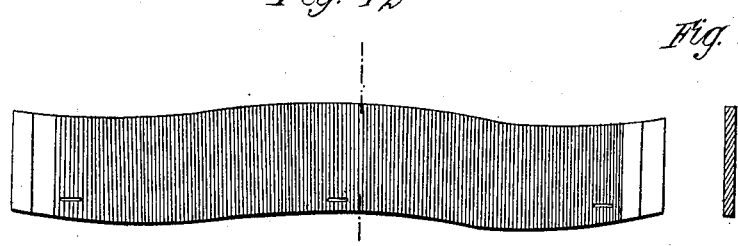
WITNESSES:
J. W. Wright
J. C. Connor
INVENTOR
ALFRED LEOPOLD WILLARD
BY
Howson and Howson
HIS ATTORNEYS.

No. 745,305. PATENTED NOV. 24, 1903.
A. L. WILLARD.
WOVEN COLLAR OR CUFF.
APPLICATION FILED SEPT. 20, 1901.
NO MODEL.
3 SHEETS—SHEET 3.
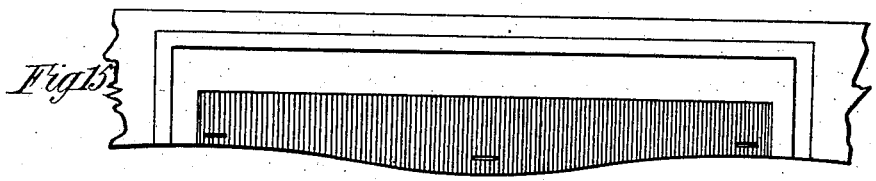
Fig. 15.
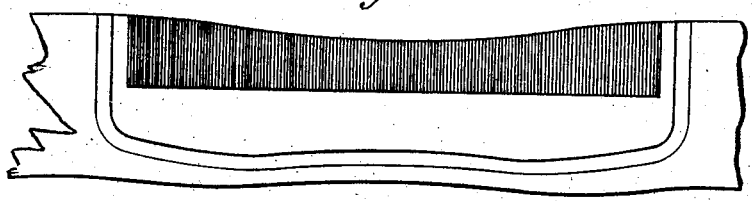
Fig. 16.
Fig. 17. Fig. 18.
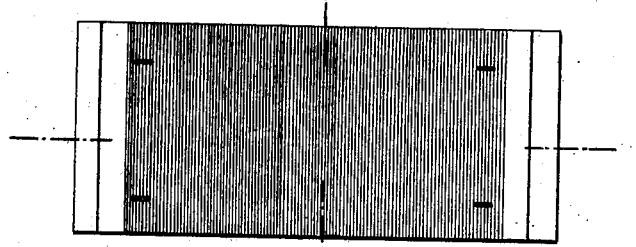 
Fig. 19.
Fig. 20. Fig. 21.
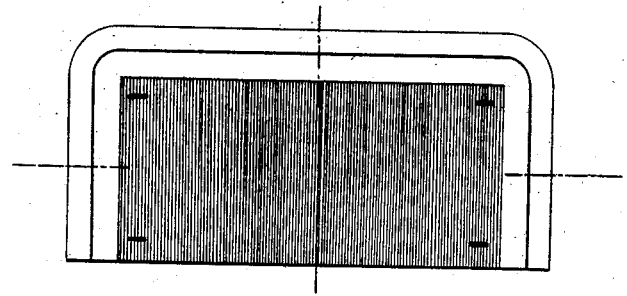 
Fig. 22.
WITNESSES:
F. W. Wright
S. C. Connor
INVENTOR
ALFRED LEOPOLD WILLARD
BY Howson and Howson
HIS ATTORNEYS.

No. 745,305. Patented November 24, 1903.

UNITED STATES PATENT OFFICE.

ALFRED LÉOPOLD WILLARD, OF PARIS, FRANCE.

WOVEN COLLAR OR CUFF.

SPECIFICATION forming part of Letters Patent No. 745,305, dated November 24, 1903.

Application filed September 20, 1901. Serial No. 75,894. (No model.)

*To all whom it may concern:*

Be it known that I, ALFRED LÉOPOLD WILLARD, engineer, a citizen of the Republic of France, residing at 139 Boulevard Voltaire, Paris, France, (whose post-office address is as above,) have invented certain new and useful Improvements in Woven Collars or Cuffs, of which the following is a specification.

This invention relates to loose collars and cuffs, and has for its object to provide a loose collar or cuff constituted of a single piece of fabric with two or more thicknesses, but the whole in a single piece of fabric of which all the parts sustain each other, the whole being directly obtained by weaving. The manufacture of collars and cuffs of this kind may be carried out in the usual manner upon any ordinary loom, and the work of finishing by hand is consequently reduced to a very small proportion.

Figure 1:
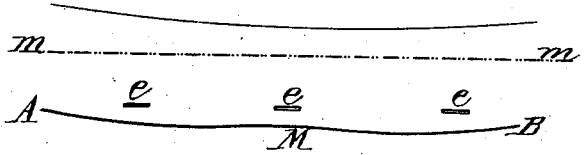
Figure 2:
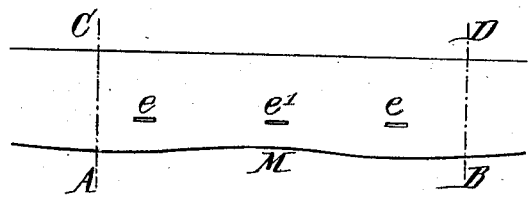
Figure 3:
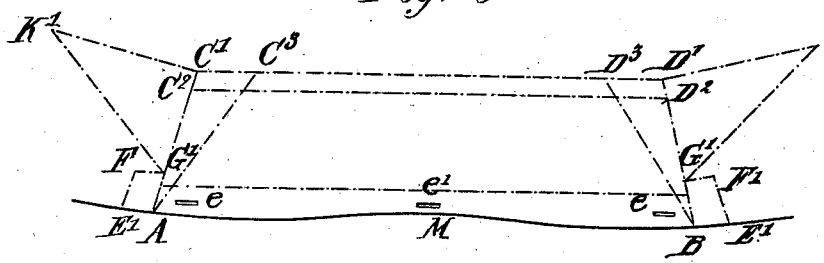
Figure 4:
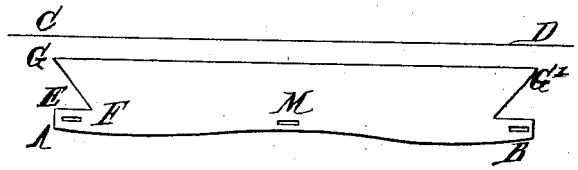

In the accompanying drawings, Figures 1, 2, and 3 are diagrams illustrating some necessary characteristics of my improved collar. Fig. 4 is a view of one form of collar. Fig. 5 is a view of a collar, showing diagrammatically the blank, the turned-in portion, and the band portion. Fig. 6 is a similar view of a modified form of collar. Fig. 7 shows still another modification. Fig. 8 is a cross-section of the collar-blank of the collar of Fig. 5 before it is made up. Figs. 9 and 10 are cross-sections showing the method of turning in the edges. Fig. 11 is a cross-section of a modified form of three-ply fabric. Figs. 12, 13, and 14 are a face view, a cross-section, and longitudinal section, respectively, of a plain straight collar. Figs. 15 and 16 show the band and the portion for turning over for folding collars. Figs. 17, 18, and 19 are views of a cuff similar to Figs. 12, 13, and 14; and Figs. 20, 21, and 22 are views of a cuff having rounded corners.

My invention consists of a collar or cuff of such a combination as to enable it to be manufactured directly by weaving either in its entirety or in part, thereby affording a more economical and regular manufacture than can be produced by hand.

A loose collar or a cuff manufactured in accordance with this invention directly by weaving differs from similar articles produced by hand in that it is not composed of a relatively large number of superposed cuttings of fabric, but of a single fabric of single thickness at the required parts, such as at the portions for buttonholes, and which is split in two or more leaflets at the required parts to provide for the "inturns," while the various parts, which form a solid uniform thickness, are all produced by the manner of mounting and operating the loom. A loose collar or a cuff thus constituted may be produced by a certain procedure in weaving as actually practiced.

Some existing processes of weaving permit of obtaining from the loom fabrics composed of several superposed layers connected or not with one another—such as, for example, in braces elastic or inelastic belts formed with an obverse and an inverse, and a chain at the middle for the purpose of giving body or thickness. Also tubular weaving may be produced in which the sides are not fastened together, such as in lamp-wicks, tubular ties, braces, &c. Thus it is possible to produce the proper kind of fabric on some of the existing looms. Further, continuous bands may be produced by weaving having a gradually-varying breadth known as "narrowing," this mode of weaving being utilized, for example, for manufacturing braces or ties. It is therefore actually possible to obtain direct from the loom curved bands according to a definite pattern, such as a loose collar. It is also possible to produce by weaving bands formed with buttonholes ready-made in the loom—as, for example, the loops of certain braces—and for this purpose Jacquard looms may be employed. These three kinds of weaving being compactible one with the other it will be possible to produce directly in the loom collars requiring little or no hand-work at all. It should, however, be remarked that the form of loose collars varies considerably. In one form there may be as many as ten subdivisions, and it may therefore be possible that a special mounting of loom for each form and its subdivisions will be too expensive if the production is not sufficiently important. This inconvenience may be obviated by observing the following points: In examining any form of loose collar it will be seen that there exists one part which for a given cut of collar may remain constant for a large number of different forms of collars, the said part being the curved neckband, which is applied to the band of the shirt-collar and which is formed with the buttonholes. Therefore a band, Fig. 2, may be woven having the form A M B with buttonholes e e' e and of any desired height, so that it may be opened according to C D, Fig. 4, cut into a collar A E F G H G' F' E' B', as indicated in Fig. 3, and finish in the usual manner.

For folding collars it suffices to consider the piece A M B, Fig. 2, as a band stitched for turning down. It will therefore be seen that a variety of forms of loose collar may be produced, and it suffices to have a pattern having the same curve A M B for all.

Figs. 5, 6, and 7 show by way of example three forms of loose collars in accordance with my invention which may be obtained by weaving in such a manner that the portion of darker shade is of single thickness, the remainder being woven in two separate leaflets, which permit of turning in edge. Figs. 8 and 9 show a section of the fabric before the turning in, while Fig. 10 shows a section through the finished collar. It should be noted that only the lower border adjacent to the buttonholes is produced on the loom, the band being of any desired width, and the other double edge is then cut off according to the required height of collar and shape. If desired, the weaving may be carried out so as to produce between the two leaflets a third leaflet, as shown in Fig. 11.

In case the loose collar is straight with square corners, which it is required to produce in large numbers, the single thickness may exist throughout the entire height of the collar by forming on the loom the two long edges of the collar, while forming the double edges for finishing at the extremities of the collar. Fig. 12 shows this kind of collar, of which Fig. 13 is a cross-section and Fig. 14 a longitudinal section.

Figs. 15 and 16 show the band and the portion for turning over the folding collars.

A cuff with square corners is absolutely comparable to loose collars, Fig. 12, as will be seen from Figs. 17, 18, and 19, which show an elevation transverse and horizontal section, respectively.

Figs. 20, 21, and 22 show similar views of a cuff having rounded corners.

In these various uses the buttonholes will be made during the weaving and by the ordinary means.

The various examples given permit of showing that it suffices to mount and operate the loom in a convenient manner for obtaining the splitting into two or more leaflets in accordance with the form required and for providing the buttonholes at the proper places, the said operations belonging to every-day operations in the art of weaving.

The advantages of my process are as follows: the facility with which a uniform band capable of being adapted to a large number of forms may be produced; a greater uniformity in the dimensions of the collar-band, which is thus mechanically obtained and no longer at the mercy of a buttonhole-cutter of more or less qualification; a great solidity of the buttonhole, as in the making of them no cutting of the threads is required, and, lastly, a considerable reduction in the cost of labor.

I claim as my invention—

1. A collar of woven material of greater length than breadth, having a longitudinal band portion with buttonholes woven therein and end portions of more than one leaflet, turned in, and stitched, substantially as described.

2. A collar of woven material, comprising a narrow longitudinal, lower band portion for the buttonholes of one thickness of fabric, and two or more leaflets of fabric integrally woven with said band and extending from it to form the collar, all substantially as described.

3. A collar or the like of woven material having buttonholes, and comprising a band portion for the buttonholes of one thickness, terminating in ends of two thicknesses to permit of turning in, and two or more leaflets interwoven with the band extending from it and turned in at their open edges to form a collar, substantially as described.

4. A woven collar having buttonholes formed by weaving, a neckband edge of an irregular curve, a band of one thickness adjacent to said edge containing said buttonholes, two or more leaflets of fabric interwoven with said band and extending from it to form the collar, the edges of said leaflets being turned in, as described.

5. A woven collar having an edge of an irregular curve, a band of one thickness containing buttonholes formed by weaving, the body of said collar being formed of two or more thicknesses with turned-in edges, substantially as described.

In testimony whereof I have signed my name to this specification in the presence of two subscribing witnesses.

ALFRED LÉOPOLD WILLARD.

Witnesses:
GUSTAVE DUMONT,
EDWARD P. MACLEAN.